United States Patent [19]
Vosbikian

[11] Patent Number: 5,502,862
[45] Date of Patent: Apr. 2, 1996

[54] PUSH BROOM LOCKING BRACKET

[75] Inventor: Peter S. Vosbikian, Moorestown, N.J.

[73] Assignee: Quickie Manufacturing Corporation, Cinnaminson, N.J.

[21] Appl. No.: 494,738

[22] Filed: Jun. 26, 1995

[51] Int. Cl.⁶ .................................................. A46B 15/00
[52] U.S. Cl. .................. 15/175; 15/145; 15/159.1; 15/171; 15/176.3; 16/114 R; 81/492; 29/401.1; 29/456; 403/315
[58] Field of Search .......................... 15/145, 146, 159.1, 15/171, 175, 176.3; 16/113, 114 R; 81/489, 492; 206/362.2; 403/263, 315, 316, 319

[56] References Cited

U.S. PATENT DOCUMENTS

| | | |
|---|---|---|
| 138,946 | 5/1873 | Smith . |
| 619,252 | 2/1899 | Dupaw ........................................ 15/146 |
| 755,985 | 3/1904 | Zacsek . |
| 1,015,263 | 1/1912 | Clark . |
| 1,785,564 | 12/1930 | Schweigert . |
| 1,983,923 | 12/1934 | Stevens . |
| 2,090,412 | 8/1937 | Geiger ........................................ 15/146 |
| 4,169,297 | 10/1979 | Weihrauch ................................ 15/145 |
| 4,293,972 | 10/1981 | Pomares ..................................... 15/145 |
| 4,541,139 | 9/1985 | Jones ........................................... 15/171 |
| 4,550,829 | 11/1985 | Strahs ........................................ 206/361 |
| 5,172,447 | 12/1992 | Tomm ........................................ 15/159.1 |
| 5,274,872 | 1/1994 | Rich ........................................... 15/145 |
| 5,337,440 | 8/1994 | Vosbikian et al. ........................ 15/143.1 |
| 5,371,916 | 12/1994 | Vosbikian .................................. 15/176.2 |

Primary Examiner—David Scherbel
Assistant Examiner—Terrence R. Till
Attorney, Agent, or Firm—Stuart M. Goldstein

[57] ABSTRACT

A dual function locking bracket for holding and supporting the handle of a push broom or other hand cleaning push tool. The bracket is configured to support the handle in two different positions. For use in transporting and merchandising circumstances, the bracket holds and secures the handle close to the brush or cleaning head of the broom, with the longitudinal axis of the handle parallel to the length dimension or longitudinal axis of the cleaning head. The bracket can be readily removed and converted to retain the handle in a cleaning use mode. Use of the bracket in this manner forms an immovable connection which prevents the handle from coming loose from the cleaning head joint with the handle, supplies an extra measure of stability to the broom at its handle/cleaning head joint, and provides the handle additional strength to prevent handle breakage.

31 Claims, 11 Drawing Sheets

PUSH BROOM LOCKING BRACKET

BACKGROUND OF THE INVENTION

Push brooms have long been used as an effective cleaning tool. The standard push broom consists of a separable elongated handle end and a brush or cleaning head. Usually the brush head is made up of bristles and a rigid bristle supporting base, often made of wood, plastic, light metal, or other hard material. The base routinely has two centrally located holes in its upper surface for receiving the handle. One hole is located on one side of the head and the second hole is located on the other side of the head. This allows the handle to be switched from one hole to the other, when the bristles become worn in one pushing direction. The holes are threaded to allow engagement with the end of the handle which has corresponding threads. The handle is easily screwed into the base in the cleaning use mode of the broom.

However, while this handle attachment arrangement provides a functional broom, several inherent problems are present. During the use of the broom, the threaded attachment between the handle and head routinely loosens, resulting in the need to stop sweeping and tighten or, if the head comes completely off, to reattach the handle and head. Additionally, the handle is sometimes caused to break near the head while sweeping, especially when the bristles are pushed against heavy material or debris. An elongated handle attached solely by threaded connection to the head presents broom instability, which increases the required sweeping effort and also tends to lead to handle breakage.

Attempts have been made in the past to address these problems and situations by means of a number of different handle to head attachments, brackets, and other configurations. Examples of these are found in U.S. Pat. Nos. 1,015,263, 1,785,564, 1,983,923, 4,541,139, 5,172,447, 5,337,440, and 5,371,916. However, these prior attachments are impractical or not readily adaptable to modern push brooms ('263), will not solve the stability or breakage problem ('923), are cumbersome or have too many parts for practical push broom use ('139, '441), or are impractical for non-commercial purposes ('440). Over and above this, none of the prior art discloses or teaches the unique features and results of the handle locking bracket of the present invention.

The locking bracket of the present invention addresses another problem inherent with commercial push broom distribution and sale. Distribution and transport of push brooms, if forwarded from the manufacturer to wholesalers, retailers, and vendors already connected in the cleaning mode, i.e. with the handle secured to the threaded hole in the head, results in a cumbersome, awkward and difficult situation. Shipping brooms in this fashion also takes up valuable cargo and container space. Displaying assembled push brooms for retail merchandising and sale presents the same handling and spatial problems.

Push broom manufacturers have attempted to address these problems by shipping their brooms with the handles and heads separated and attached side by side. Handles and heads are attached with their respective longitudinal axii in parallel relationship. While this has, to a large extent, solved the handling and spatial problems, actually attaching the handles and heads so that they remain secured during transport and shipment and then during the merchandising and display process continues to be a problem. Handles and heads routinely become separated between the time of shipment from manufacturer to the ultimate sale to the consumer. This causes inconvenience and inefficiency during transport, results in debris and waste from separated broom components and wrappers, leads to actual loss of components, and presents unattractive merchandising displays - all resulting in a general and substantial loss of sales.

In the past, manufacturers have attempted to attach push broom head and handles by means of string or twine, twist ties, and a variety of plastic and metal clips. One such spring clip type device is disclosed in U.S. Pat. No. 4,550,829. However, none of the prior broom handle to head attaching means have provided a system to guarantee an effective, practical, and economical system to allow for the transport and merchandising of a push broom without handle to head separation. And no prior systems disclose the unique features and results of the dual function handle locking bracket of the present invention.

SUMMARY OF THE INVENTION

It is the object of the present invention to overcome the limitations and disadvantages of prior push brooms and hand cleaning push tools.

It is a general object of the invention to provide a handle locking bracket which serves the dual function of being used to lock the handle to the cleaning head of a push broom during the transport and merchandising mode of the push broom and in the cleaning use mode of the push broom.

It is another object of the invention to provide a handle locking bracket which will maintain the handle of a push broom in an immoveable, locked position to the cleaning head of the broom when the broom is in its cleaning mode.

It is a further object of the invention to provide a handle locking bracket which increases the strength of the joint between the handle and cleaning head of the push broom.

It is still another object of the invention to provide a handle locking bracket which provides the necessary support between the handle and cleaning head to prevent handle breakage.

It is still another object of the invention to provide a handle locking bracket which contributes to the stability and the ease of handling of the push broom or hand cleaning push tool.

It is a further object of the invention to provide an efficient, effective, and economical means of securing the handle to the cleaning head during the transport and merchandising of the push broom.

It is still another object of the invention to provide a handle locking bracket which will effectively and efficiently secure the handle to the cleaning head without risk of separation during transport and merchandising of the push broom.

It is still a further object of the invention to provide an efficient, effective, and economic means of securing the handle to the cleaning head in order to save valuable cargo and container space, to ensure distribution and sale efficiency, to prevent loss of broom components during transport and merchandising, and to save resources needed to produce and dispose of non-reusable handle to head connectors.

These and other objects are accomplished by the present invention which comprises a locking bracket which holds and supports the handle of a push broom or other hand cleaning push tools, such as shovels, mops, floor squeegees, and other implements where a cleaning head is joined to a handle. The bracket is configured and designed to support the handle in two different positions. For use in transporting and merchandising circumstances, the bracket holds and secures the handle adjacent to the brush or cleaning head of the broom, with the longitudinal axis of the handle being parallel to the length dimension or longitudinal axis of the cleaning head. The handle is held and supported by integral bracket retaining means or tabs which tighten the handle, under pressure, when the bracket is secured to the cleaning head.

The bracket can be readily removed and converted to retain the handle for use in a cleaning use mode. In this mode, the handle, which has a threaded end adapted to be screwed into the cleaning head in the conventional manner, is inserted into a multi-sided opening in the bracket, which opening is configured and sized to conform with a multi-sided section of the handle. The shape of the multi-sided bracket opening and corresponding multi-sided handle section is configured with more than two sides. It thus can be of triangular, rectangular, or even oval configuration. It has been found, however, that a hexagonal shape is most advantageous and is preferred, because it allows any one of several points of the hexagon to be aligned directly toward the front of the cleaning head, while still permitting the handle to be sufficiently tightened into the cleaning head in the cleaning use mode. The proper positioning of the bracket in relation to the cleaning head and the handle can then be accomplished.

After the threaded end connection of the handle is screwed into the threaded opening in the cleaning head and tightened so that the multi-sided section of the handle is aligned with one point directly towards the front of the cleaning head, the multi-sided opening of the bracket is positioned around the multi-sided section of the handle. The bracket is then attached to the cleaning head. In this manner, an immovable lock is formed between the multi-sided section of the handle and the multi-sided opening of the bracket secured to the head. This immovable lock prevents the handle from coming loose from the cleaning head or even moving in any manner. It also supplies an extra measure of stability to the broom at its handle/cleaning head joint and provides the handle additional strength at this point to prevent breakage of the handle during cleaning use of the push broom.

Use of the bracket in the transport/merchandising mode eliminates the need for clips, twist ties, or other disposable connectors. There is no waste generated by using the bracket, since the bracket is transformed from a transport retaining bracket to an integral component of the push broom, unlike the clips, ties, etc. which become extraneous after the broom is put in the cleaning mode. Consequently, energy and resources are saved in not having to produce and eventually dispose of alternate connectors.

The novel features which are considered as characteristics of the invention are set forth in particular in the appended claims. The push broom locking bracket and the bracket in combination with the broom themselves, however, both as to their design, construction, and use, together with additional features and advantages thereof, are best understood upon review of the following detailed description with reference to the accompanying drawings.

DETAILED DESCRIPTION OF THE INVENTION

Handle lock bracket 1 is a solid, integral body, preferably made of metal, plastic, or other suitably hard material. It has lower bracket support feet 2 and 3 which are designed to rest on the top surface of a brush cleaning head 12 or other cleaning head member. There is a cutout 4 in the lower side of the bracket to allow an opening for the insertion of a handle into the cleaning head, as will be more fully described hereinafter. Bracket holes 5 and 6 are located through the lower support sections and form the means by which the bracket is attached to the cleaning head 12, with the use of fastening screws 18 and 19.

Figure 1:
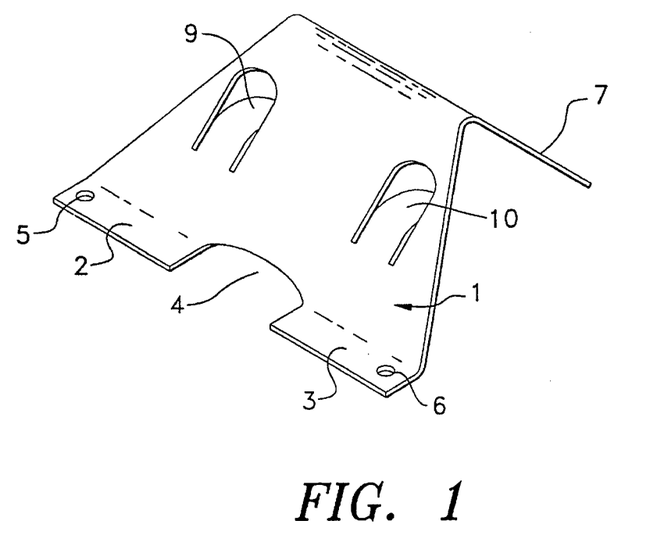
FIG. 1 is a perspective view of the handle locking bracket.
Figure 2:
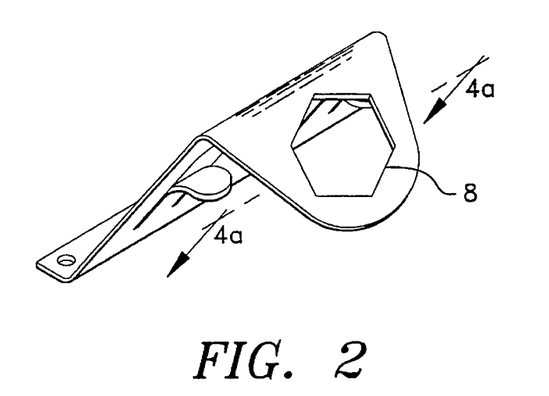
FIG. 2 is a perspective view of the opposite side of the handle locking bracket that is shown in FIG. 1.
Figure 3:
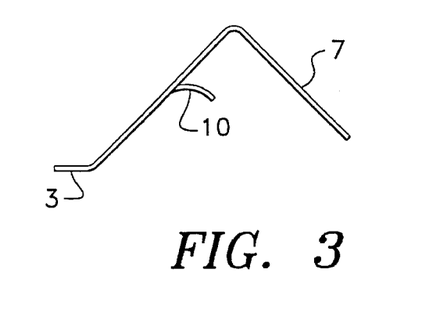
FIG. 3 is a side view of the handle locking bracket.
Figure 4A:
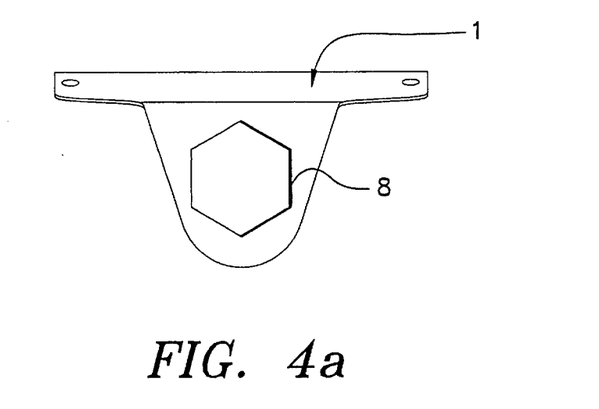
FIG. 4a is a top view of the preferred embodiment of the handle locking bracket.
Figure 4B:
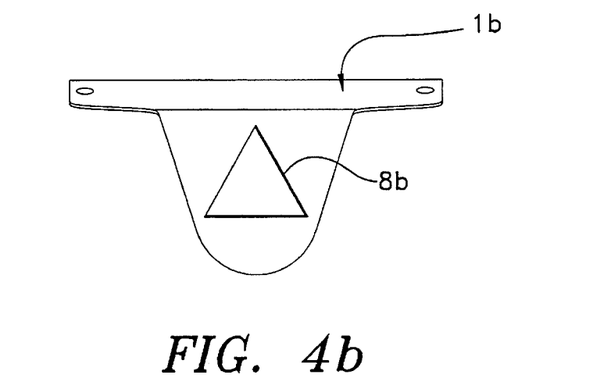
FIG. 4b is a top view of an alternate embodiment of the handle locking bracket.
Figure 4C:
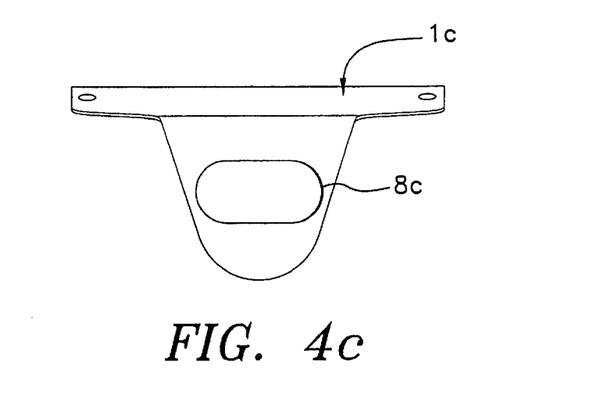
FIG. 4c is a top view of another alternate embodiment of the handle locking bracket.

Bracket 1 has an upper outwardly extending section 7 which has a multi-sided opening 8 therethrough. This opening can be in the form of a hexagon, as shown in the preferred embodiment of FIGS. 2 and 4a. It can readily be formed as other convenient geometric shapes with multiple sides, like the triangle opening 8b through bracket 1b shown in FIG. 4b, or even an oval opening 8c through bracket 1c shown in FIG. 4c. However, the use of a hexagon opening or other shaped opening with five, six or more sides is preferred, since these shapes are more readily adapted to attachment and alignment with the front of the cleaning head in the cleaning mode, as described hereinafter. Bracket 1 also has two outwardly extending tab arms 9 and 10.

Figure 7:
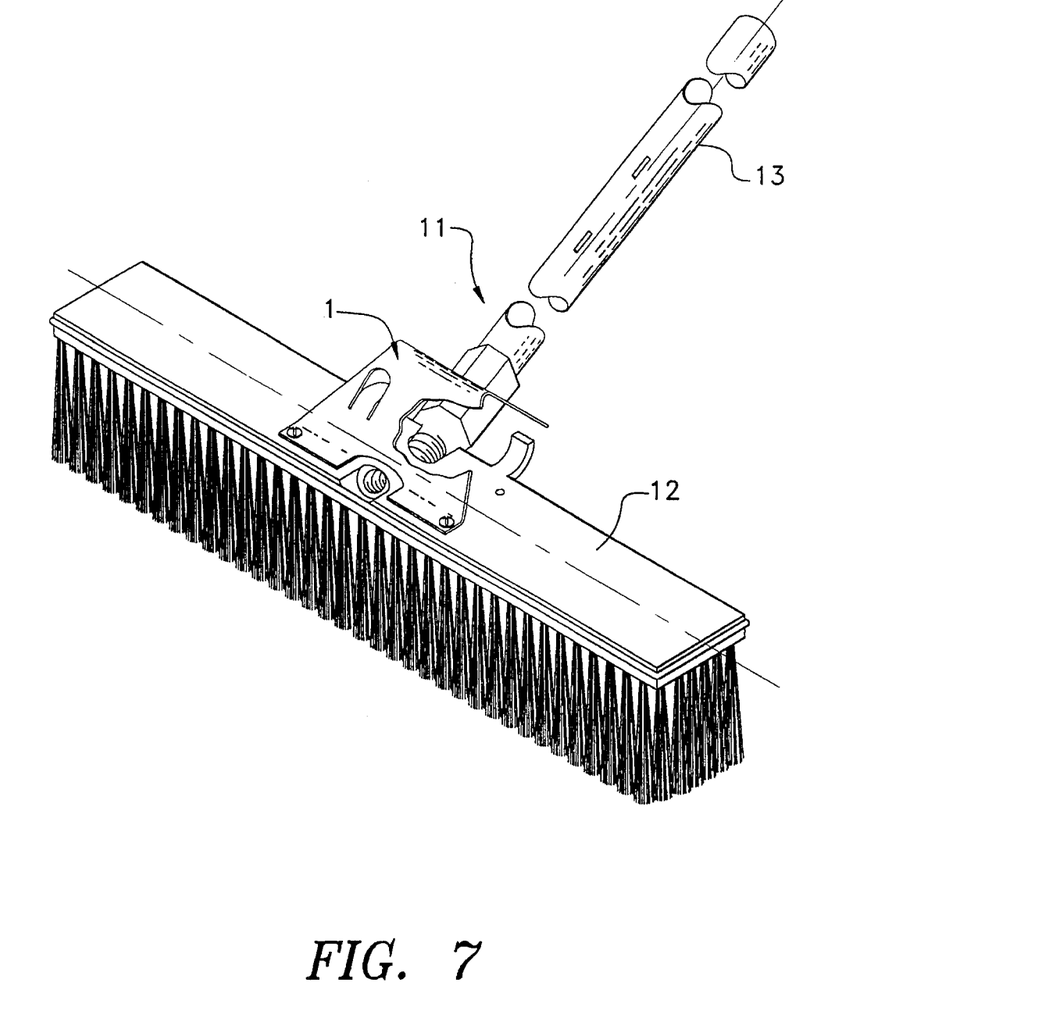
FIG. 7 is a perspective view of the push broom assembled in the cleaning use mode.

While the use of alternate hand cleaning tools is contemplated, bracket 1 is shown in use with push broom 11 in FIG.

7. Push broom 11 consists of cleaning head 12 and elongated handle 13.

Figure 6:
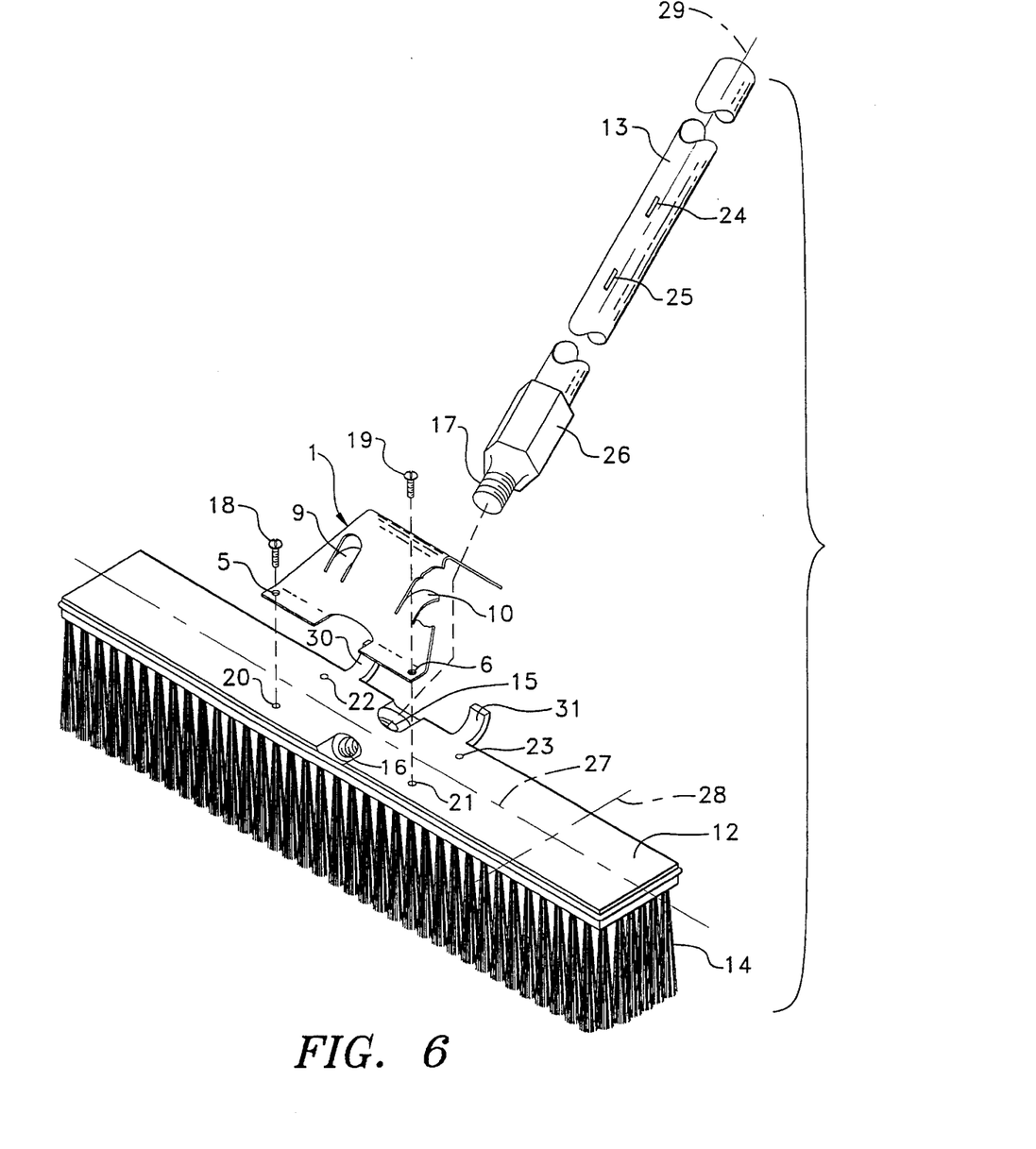
FIG. 6 is an exploded view of the components of the push broom prior to assembly in the cleaning use mode.

As best shown in FIG. 6, the cleaning head 12 has a lengthwise longitudinal axis 27 and a transverse width axis 28. It has cleaning bristles 14 and threaded holes 15 and 16. These holes are adapted to receive the end of handle 13, which has corresponding threaded connection 17. The threaded connection 17 at the end of handle 13 is inserted and screwed into one of the two holes 15 or 16 in the cleaning head 12. This forms the initial attachment joint between the handle 13 and cleaning head 12. As is the common practice, handle 13 can be unscrewed from one of the threaded holes, either 15 or 16, and screwed into the other hole, when bristles 14 become worn in one direction from prolonged sweeping action from one side of the push broom.

Figure 10:
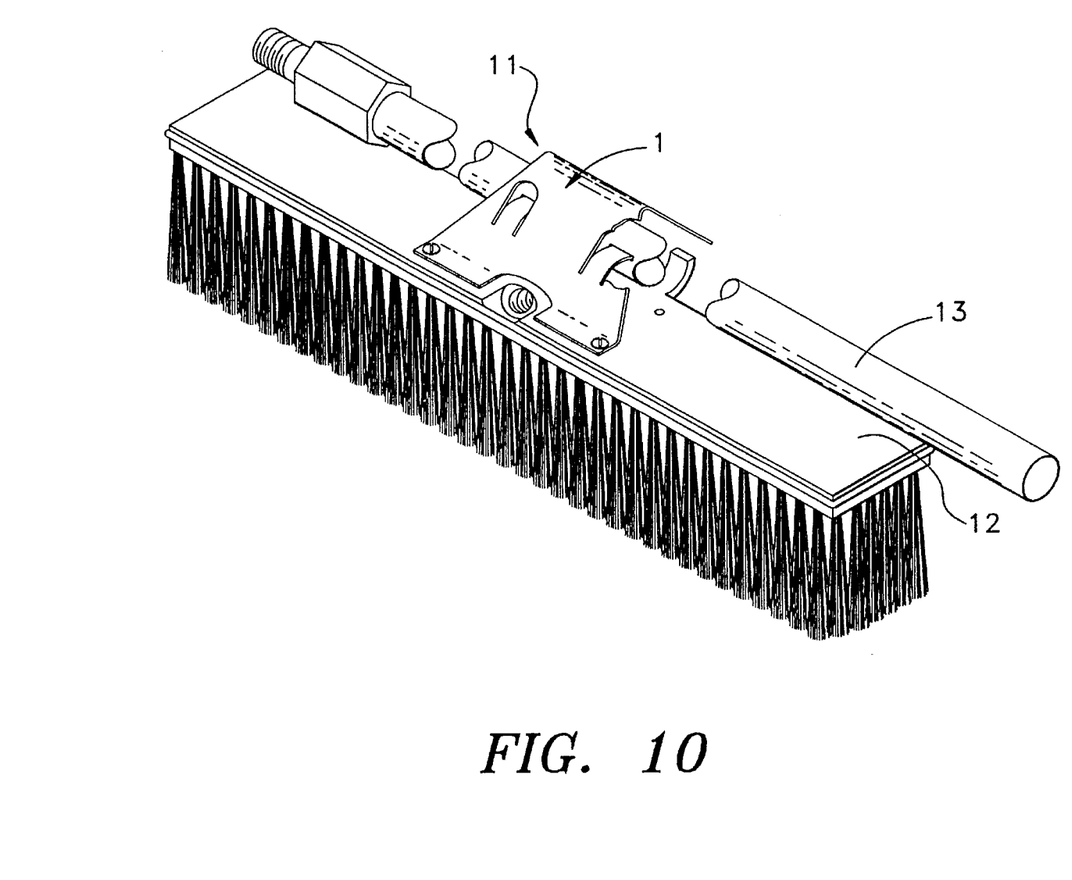
FIG. 10 is a perspective view of the push broom assembled in the transporting and merchandising mode.
Figure 12:
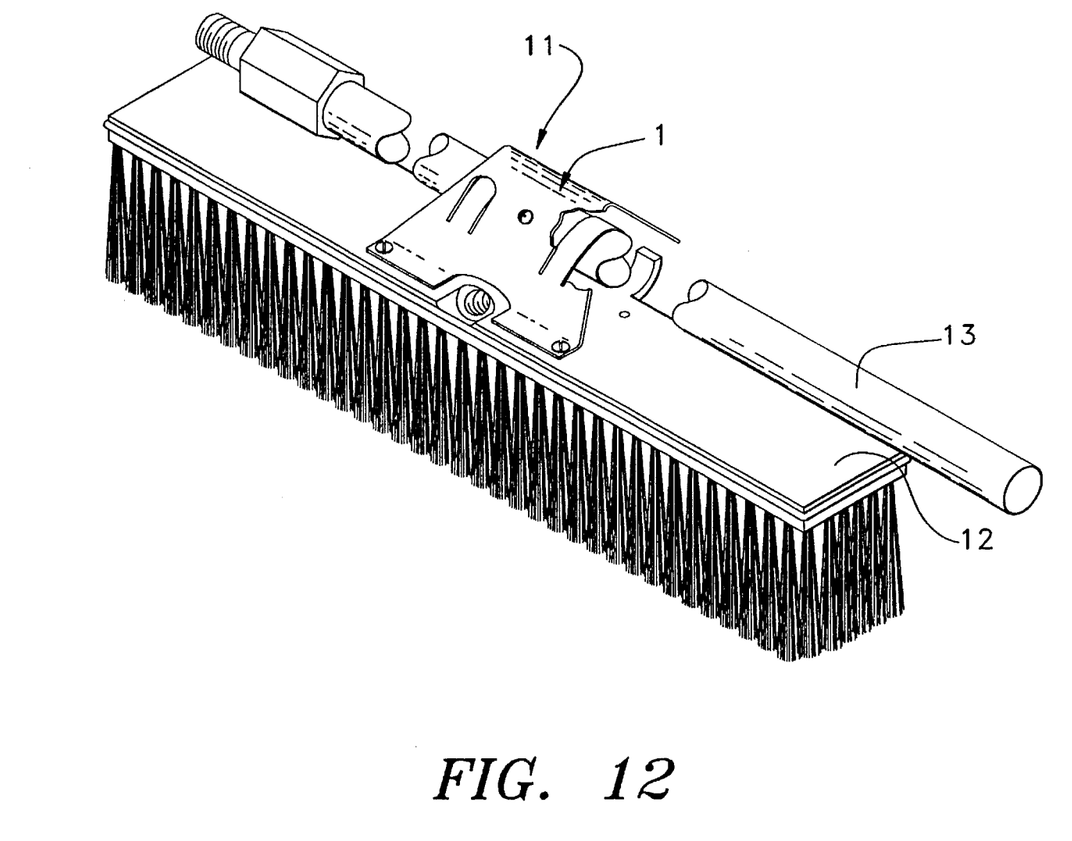
FIG. 12 is a perspective view of the push broom assembled in an alternate embodiment of the transporting and merchandising mode.

Bracket 1 is secured to cleaning head 12 by screw fasteners 18 and 19, whether the push broom is used in the transport and merchandising mode shown in FIGS. 10 and 12, or in the cleaning use mode shown in FIG. 7. Screws 18 and 19 go through bracket holes $ and 6 and into the screw receiving holes 20 and 21, or 22 and 23, depending into which hole, 15 or 16, handle 13 is inserted.

Figure 11:
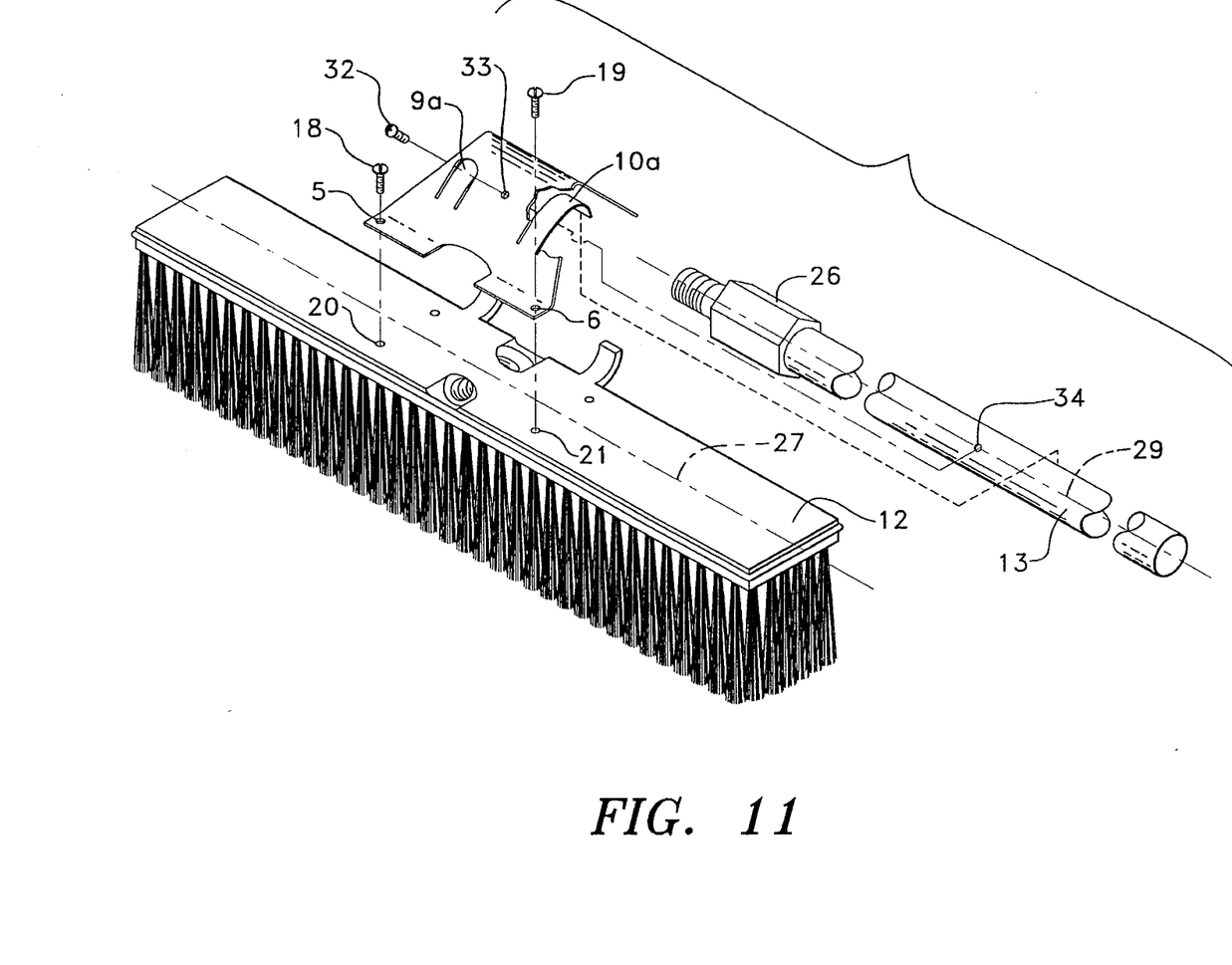
FIG. 11 is an exploded view of the components of the push broom prior to assembly in an alternate embodiment of the transporting and merchandising mode.

Elongated handle 13 has a longitudinal axis 29 which extends through its length. Handle 13 has two slots 24 and 25, into which tab arms 9 and 10 respectively are to be inserted in the transporting and merchandising mode shown in FIG. 10. In an alternate embodiment, shown in FIG. 11, arms 9a and 10a are configured to wrap over and around the surface of the handle.

Figure 5A:
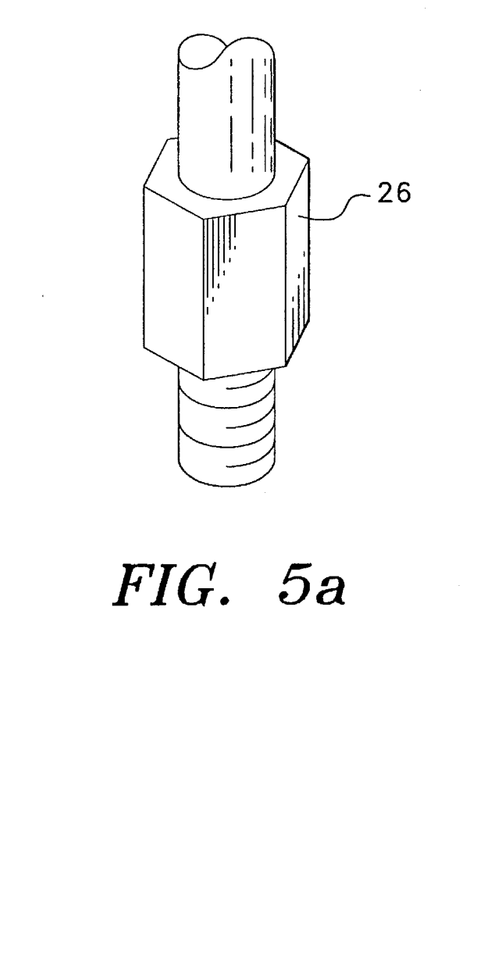
FIG. 5a is a perspective view of the preferred embodiment of the multi-sided section of the handle.
Figure 5B:
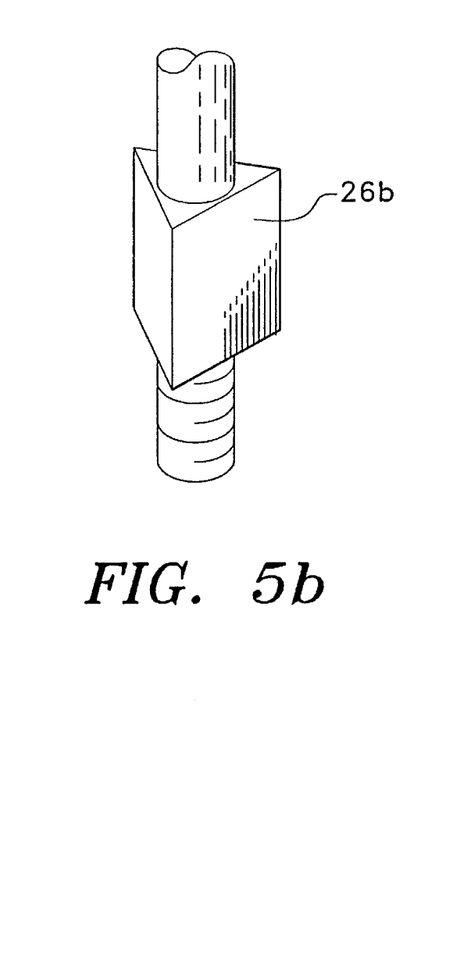
FIG. 5b is a perspective view of an alternate embodiment of the multi-sided section of the handle.
Figure 5C:
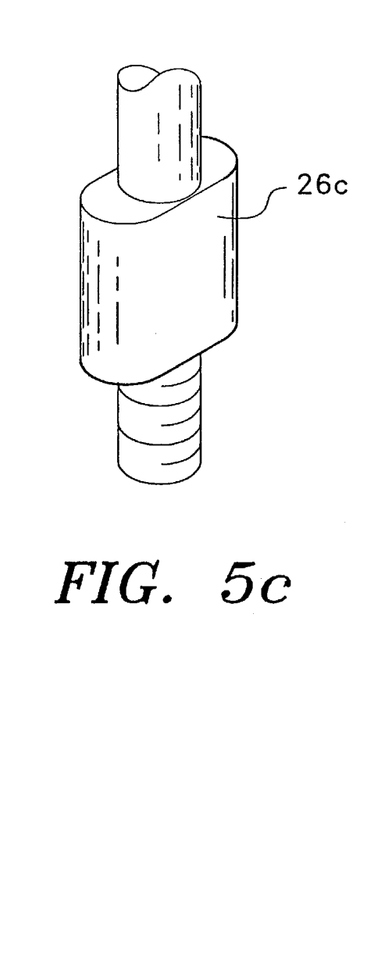
FIG. 5c is a perspective view of another alternate embodiment of the multi-sided section of the handle.

Handle 13 also has a multi-sided section 26 extending out from the body of the handle and located immediately adjacent to the threaded connection 17 at the end of the handle. Multi-sided section 26, shown as a hexagon shape in the preferred embodiment of FIG. 5a, must be the same geometric shape as the multi-sided opening 8 of the bracket. Alternate embodiments shown in FIGS. 5b and 5c are examples of other multi-sided sections 26b (triangular configuration) and 26c (oval configuration) respectively.

Figure 8:
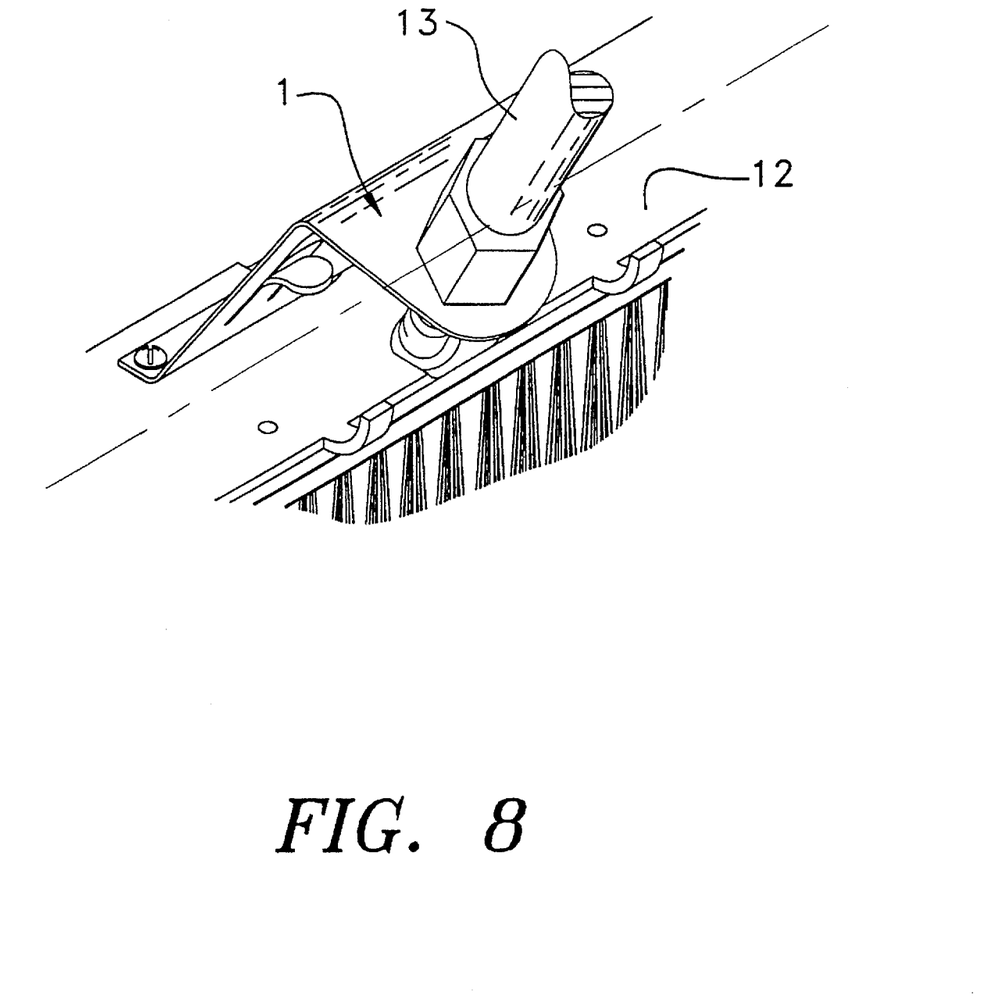
FIG. 8 is a perspective rear view of the assembly of the push broom handle to the cleaning head by means of the handle locking bracket in the cleaning use mode.

In the preferred embodiment best shown in FIG. 8, the perimeter of section 26 is slightly smaller than opening 8, so that opening 8 can fit directly over, geometrically conform with, and surround the corresponding sides of section 26 to allow only slight movement or play between bracket 1 and handle 13. This play, caused by the slight difference in perimeters between opening 8 and section 26, is large enough to allow section 26 and thus handle 13 to slide through opening 8, but small enough that handle 13 can not be turned once section 26 is positioned in opening 8.

Figure 9:
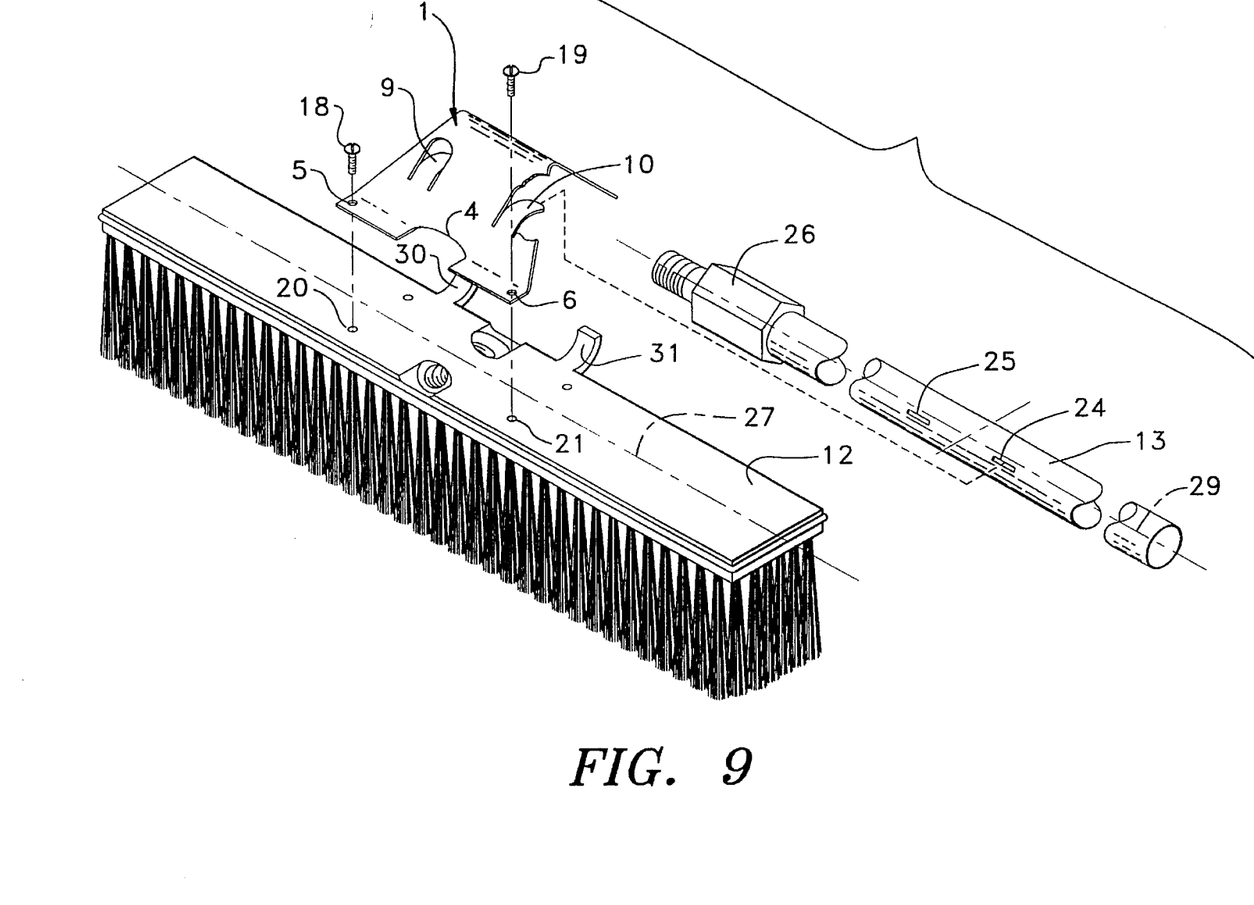
FIG. 9 is an exploded view of the components of the push broom prior to assembly in the transporting and merchandising mode.

The bracket 1 works in combination with the other elements of the push broom as follows. When the broom is to be transported from, for example, the manufacturer to the wholesaler or vendor and then displayed and merchandised at the retail store, it is in the transporting and merchandising mode, shown in FIGS. 9 and 10. To attach handle 13 to cleaning head 12 in this mode, handle 13 is positioned alongside and over the top surface of the cleaning head 12, with its longitudinal axis 29 parallel to the longitudinal axis 27 of the cleaning head 12. Guide tabs 30 and 31 projecting from the top surface of cleaning head 12 assist in positioning handle 13 longitudinally on the head. Bracket 1 is placed with its lower support feet 2 and 3 on the top surface of cleaning head 12, with cutout 4 surrounding threaded hole 16 and bracket holes 5 and 6 aligned over cleaning head holes 20 and 21 (or 22 and 23) respectively. Handle 13 is then positioned to allow tab arms 9 and 10 of the bracket to be inserted into slots 24 and 25 of the handle. In the alternate embodiment shown in FIGS. 11 and 12, tab arms 9a and 10a overlay and wrap around the surface of handle 13.

Figure 13:
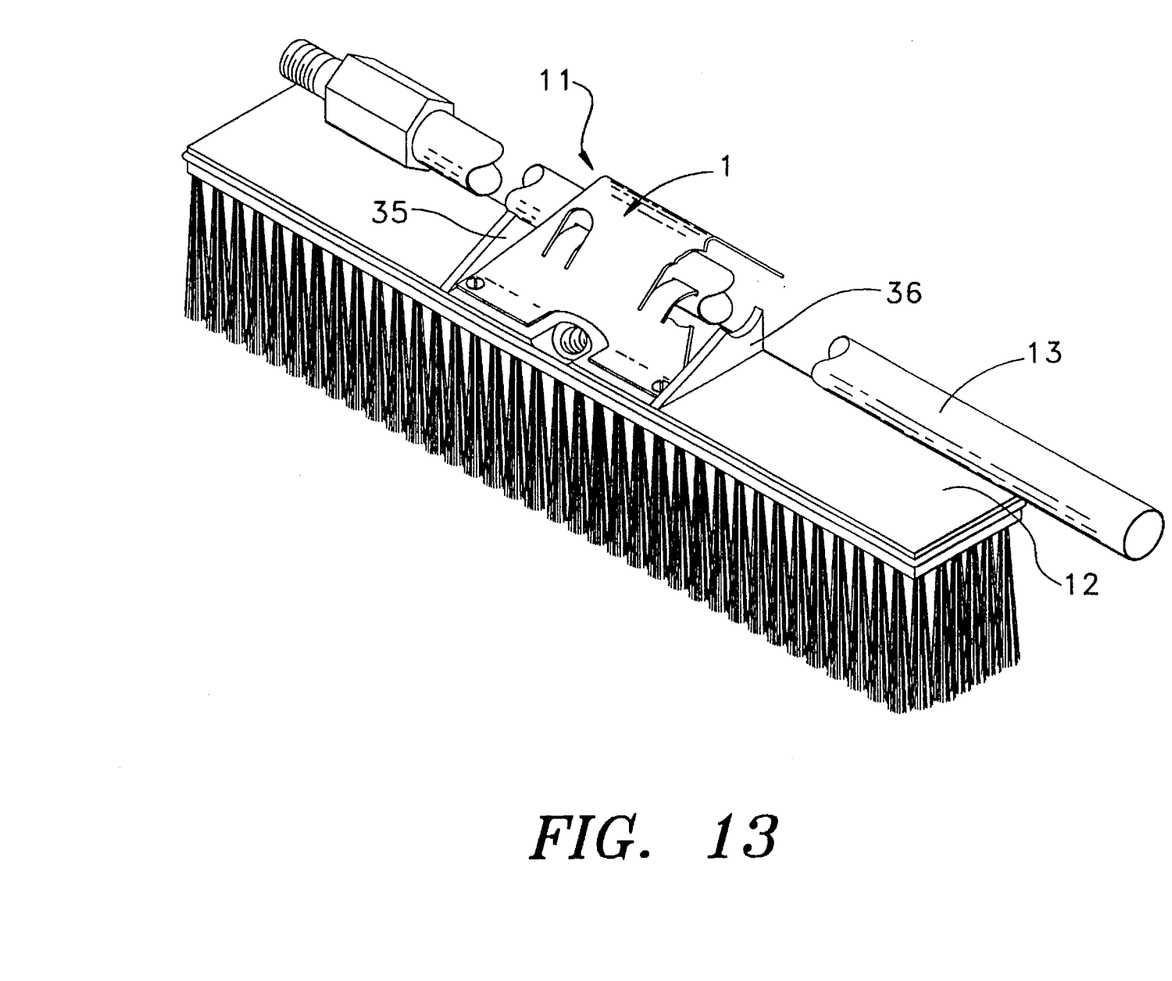
FIG. 13 is a perspective view of the handle attachment section of the push broom in the transporting and merchandising mode, showing an alternate handle positioning support.

FIG. 13 shown an alternative configuration for positioning handle 13 on cleaning head 12. In lieu of guide tabs 30 and 31, handle cradle guide arms 35 and 36 project from the top surface of cleaning head 12, in order to allow handle 13 to be readily positioned and supported for ease of attachment by bracket 1 in the transporting and merchandising mode.

In all transporting and merchandising mode embodiments, screw fasteners 18 and 19 are passed through bracket holes 5 and 6 and screwed securely into cleaning head holes 20 and 21. In this manner bracket 1 becomes securely attached to cleaning head 12 and tab arms 9 and 10 (or 9a and 10a) hold handle 13 under pressure, thus retaining handle 13 in place over cleaning head 12. As an extra measure of protection to ensure that cleaning head 12 and handle 13 remain secure, whether tab arms are inserted into the handle or are wrapped around it, another screw fastener 32 can be inserted into hole 33 through bracket 1 and screwed into hole 34 in handle 13.

Handle 13 will not be caused to come loose or detach from bracket 1 or cleaning head 12 unless screw fasteners 18 and 19 and optional screw 32 are loosened so that tab arms 9 and 10 of bracket 1 can be withdrawn from slots 24 and 25, in the embodiment shown in FIG. 10, or tab arms 9a and 10a are removed and lifted from around the surface of handle 13, in the embodiment shown in FIG. 12.

After handle 13 is removed from the transport/merchandising positions shown in FIGS. 10 and 12, the push broom can be set up for use in the cleaning mode, shown in FIGS. 6–8. To this end, threaded connection 17 at the end of handle 13 is inserted into threaded hole 15 and handle 13 is attached to cleaning head 12 by screwing threaded connection 17 into threaded hole 15. The other end of handle 13 is then inserted through multi-sided bracket opening 8 of bracket 1 and the bracket is slid down the handle. It is then positioned so that multi-sided bracket opening 8 is placed directly over the multi-sided section 26 of handle 13 so that the sides of bracket opening 8 exactly conform with and surround the sides of the multi-sided section 26. Bracket support feet 2 and 3 are then positioned on the top surface of cleaning head 12, with bracket holes 5 and 6 aligned over cleaning head holes 20 and 21. Of course, if handle 13 is to be inserted into threaded hole 16 on the opposite side of cleaning head 12, then bracket holes 5 and 6 are aligned over cleaning head holes 22 and 23.

It is important to ensure that bracket opening 8 exactly conforms with and surrounds the sides of multi-sided section 26 and, at the same time, that bracket holes 5 and 6 are aligned with cleaning head holes 20 and 21. To accomplish this, threaded connection 17 of handle 13 must be tightened into threaded hole 15 and also positioned such that one point of the geometric shape of multi-sided section 26, in FIGS. 5a, 6-8 shown as a hexagon, is pointed directly towards the front of cleaning head 12, such that it corresponds with bracket opening 8 when bracket holes 5 and 6 are positioned over cleaning head holes 20 and 21. Use of multi-sided opening/section configurations with a lesser number of sides like those shown in FIGS. 4b, 5b and 4c, 5c is possible, however, the number of handle to cleaning head screw turns which are possible and which still allow handle alignment with the front of the cleaning head are limited if lesser sides are used. In order to assure that handle 13 can easily and sufficiently be tightened and also be aligned with the front of cleaning head 12 so as to permit the correct positioning of bracket 1, the preferred hexagon shape of handle section 26 and bracket opening 8 are employed.

Once bracket 1 is in position with bracket opening 8 placed directly over the sides of multi-sided section 26 and bracket holes 5 and 6 over cleaning head holes 20 and 21, screw fasteners 18 and 19 are passed through bracket holes 5 and 6 and screwed securely into cleaning head holes 20 and 21. In this manner, bracket 1 becomes securely attached to cleaning head 12. Most significantly, however, a locking system is formed which prevents the joint between handle threaded connection 17 and cleaning head hole 15 from moving. The combination of bracket 1 being secured to cleaning head 12 and the handle immobility caused by bracket opening 8 around multi-sided section 26, absolutely prevents any movement, much less a loosening of the handle to cleaning head joint.

The enhanced supported connection allowed by the attachment of bracket 1 in this fashion also increases the overall stability of the push broom during the cleaning use process and increased support of the joint higher up on the handle inhibits the possibility of handle breakage during the sweeping process.

The dual use of bracket 1 as described above allows the easy and ready removal by the consumer of handle 13 from the transport/merchandising mode in which the push broom is distributed by the manufacturer. The consumer can simply convert the push broom to the cleaning use mode by using the same bracket provided by the manufacturer for transport and distribution.

When transporting the push broom, the consumer also can convert from the cleaning mode by loosening and detaching bracket 1, placing and reattaching handle 13 and cleaning head 12 in side by side parallel position once again, and securing bracket 1 as shown in FIGS. 10 or 12.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

I claim:

1. A handle locking bracket for use on a hand cleaning implement having a separable elongated handle with a radially positioned, multi-sided section located adjacent to attachment means at the end of the handle, and a cleaning head member with receiving means to accept and form a joint with the handle end attachment means, said bracket comprising:

a. an integral unitary bracket body;
   b. means for attaching the bracket body in an upright position to the cleaning head member;
   c. multi-sided bracket opening means through the bracket body, said multi-sided opening means being exactly sized to receive, geometrically conform with, and surround the multi-sided section of the handle, whereby upon positioning of the multi-sided opening means over the multi-sided section of the handle, the sides of the multi-sided opening means surround, conform with, and are in close proximity to the sides of the multi-sided section of the handle to form a static lock means which retains in place and completely immobilizes the joint between the cleaning head member and handle end attachment means.

2. A handle locking bracket as described in claim 1 in which the cleaning head member receiving means comprises a threaded opening and the handle end attachment means comprises a threaded connector to be screwed into the threaded opening, forming the joint between the handle end attachment means and the cleaning head member when the threaded connector and threaded opening are screwed together.

3. A handle locking bracket as described in claim 2 whereby the static lock means retains in place and completely immobilizes the joint by preventing the threaded connector from moving within the threaded opening after the threaded connector is screwed into the threaded opening.

4. A handle locking bracket as described in claim 1 where the means for attaching the bracket body comprises holes in the bracket body which receive fasteners which join the bracket body to the cleaning head member.

5. A handle locking bracket as described in claim 1 in which the multi-sided bracket opening means comprises six sides.

6. A handle locking bracket as described in claim 1 in which the multi-sided bracket opening means comprises more than two sides.

7. A handle locking bracket for use with a hand cleaning implement comprising a separable elongated handle having a longitudinal axis running the length of the handle, and a cleaning head member having a width with a transverse axis and a longitudinal axis running the length of the head member such that in the normal cleaning use mode of the implement the handle is connected to the cleaning head member such that the longitudinal axis of the handle is perpendicular to the longitudinal axis of the cleaning head member, said bracket comprising:

a. an integral unitary bracket body;
   b. bracket attachment means which securely attaches the bracket body to the cleaning head member and which is readily removable to allow for the release of the bracket body from the cleaning head member; and
   c. handle retaining means integral with and extending out from the bracket body for rigidly supporting and securing the handle with its longitudinal axis parallel to the longitudinal axis of the cleaning head member when the bracket attachment means is attached to the cleaning head member; and said handle being readily removable from the handle retaining means when the bracket body is released from the cleaning head member.

8. A handle locking bracket as described in claim 7 in which the handle retaining means comprises arms which surround the handle.

9. A handle locking bracket as described in claim 7 in which the handle retaining means comprises arms which are inserted into slots in the handle.

10. A handle locking bracket as described in claim 7 where the bracket attachment means comprises holes in the bracket body and fasteners which join the bracket body to the cleaning head member and which can be removed for the release of the bracket body from the cleaning head member.

11. A handle locking bracket as described in claim 7 which includes a fastener means which is secured through the bracket into the handle.

12. A handle locking bracket as described in claim 7 in which the cleaning head member has guide means on its surface for positioning the handle on the surface.

13. A handle locking bracket for use in the transporting and merchandising mode and for use in the cleaning use mode of a hand cleaning implement having a cleaning head member and a separable elongated handle with a radially positioned, multi-sided section and a longitudinal axis running the length of the handle, the head member conformed to be secured directly to the end of the handle in the cleaning use mode, said bracket comprising:

a. an integral unitary bracket body;

b. means for attaching the bracket body in an upright position to the cleaning head member;

c. multi-sided bracket opening means through the bracket body, said multi-sided opening means being exactly sized to receive, geometrically conform with, and surround the multi-sided section of the handle in the cleaning use mode of the hand cleaning implement; and d. handle retaining means integral with and extending out from the bracket body for rigidly supporting and securing the handle along its longitudinal axis to the cleaning head member in the transporting and merchandising mode of the hand cleaning implement.

14. A handle locking bracket as described in claim 13 whereby upon positioning of the multi-sided opening means over the multi-sided section of the handle, the sides of the opening means surround and are in close proximity to the sides of the multi-sided section of the handle to form a static lock means which retains in place and completely immobilizes the handle and cleaning head member when they are joined in the cleaning use mode.

15. A handle locking bracket as described in claim 14 in which the end of the handle comprises a threaded connector and the cleaning head member comprises a threaded opening to accept the threaded connector, forming a joint between the handle and cleaning head member when the threaded connector and threaded opening are screwed together.

16. A handle locking bracket as described in claim 15 whereby the static lock means retains in place and completely immobilizes the joint by preventing the threaded connector from moving within the threaded opening after the threaded connector is screwed into the threaded opening.

17. A handle locking bracket as described in claim 13 where the means for attaching the bracket body comprises holes in the bracket body which receive fasteners which join the bracket body to the cleaning head member.

18. A handle locking bracket as described in claim 13 in which the multi-sided bracket opening means comprises six sides.

19. A handle locking bracket as described in claim 13 in which the multi-sided bracket opening means comprises more than two sides.

20. A handle locking bracket as described in claim 13 in which the cleaning head member has a width and a transverse axis such that in the cleaning use mode of the implement the handle is connected to the head member so that the longitudinal axis of the handle is perpendicular to the longitudinal axis of the head member and in the transporting and merchandising mode the handle retaining means supports and secures the handle with its longitudinal axis parallel to the longitudinal axis of the cleaning head member when the means for attaching the bracket body is attached to the cleaning head member, said handle being readily removable from the handle retaining means when the bracket body is released from the cleaning head member.

21. A handle locking bracket as described in claim 13 in which the handle retaining means comprises arms which surround the handle.

22. A handle locking bracket as described in claim 13 in which the handle retaining means comprises arms which are inserted into slots in the handle.

23. A handle locking bracket as described in claim 13 where the means for attaching the bracket body comprises holes in the bracket body and fasteners which join the bracket body to the cleaning head member and which can be removed for the release of the bracket body from the cleaning head member.

24. A handle locking bracket as described in claim 13 which includes a fastener means which is secured through the bracket into the hole.

25. A handle locking bracket as described in claim 13 in which the cleaning head member has guide means on its surface for positioning the handle on the surface.

26. A hand cleaning implement comprising:

a. a separable elongated handle having a radially positioned, multi-sided section adjacent to attachment means at the end of the handle;

b. a cleaning head member with receiving means to accept and form a joint with the handle end attachment means;

c. a handle locking bracket comprising:

(i) an integral unitary bracket body;

(ii) means for attaching the bracket body in an upright position to the cleaning head member;

(iii) multi-sided bracket opening means through the bracket body, said multi-sided opening means being exactly sized to receive, geometrically conform with, and surround the multi-sided section of the handle, whereby upon positioning of the multi-sided opening means over the multi-sided section of the handle, the sides of the multi-sided opening means surround and are in close proximity to the sides of the multi-sided section of the handle to form a static lock means which retains in place and completely immobilizes the joint between the cleaning head member and handle end attachment means.

27. A hand cleaning implement as described in claim 26 in which the handle end attachment means comprises a threaded connector and the cleaning head member receiving means comprises a threaded opening to accept the threaded connector, forming the joint between the handle and attachment means and the cleaning head member when the connector and threaded opening are screwed together.

28. A hand cleaning implement as described in claim 27 whereby the static lock means retains in place and completely immobilizes the joint by preventing the threaded connector from moving within the threaded opening after the connector is screwed into the threaded opening.

29. A hand cleaning implement as described in claim 26 where the means for attaching the bracket body comprises holes in the bracket body which receive fasteners which join the bracket body to the cleaning head member.

30. A hand cleaning implement as described in claim 26 in which the multi-sided bracket opening means comprises six sides.

31. A hand cleaning implement as described in claim 26 in which the multi-sided bracket opening means comprises more than two sides.

* * * * *